(12) United States Patent
Busch-Sorensen

(10) Patent No.: US 9,323,964 B2
(45) Date of Patent: Apr. 26, 2016

(54) CARD DETECTION AND SELECTION

(71) Applicant: Cubic Corporation, San Diego, CA (US)

(72) Inventor: Thomas Busch-Sorensen, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 18 days.

(21) Appl. No.: 14/463,383

(22) Filed: Aug. 19, 2014

(65) Prior Publication Data
US 2015/0054624 A1 Feb. 26, 2015

Related U.S. Application Data

(60) Provisional application No. 61/982,638, filed on Apr. 22, 2014, provisional application No. 61/867,931, filed on Aug. 20, 2013.

(51) Int. Cl.
*H04Q 5/22* (2006.01)
*G08B 13/14* (2006.01)
(Continued)

(52) U.S. Cl.
CPC ........ *G06K 7/10039* (2013.01); *G06K 7/10079* (2013.01); *G06K 7/10217* (2013.01)

(58) Field of Classification Search
CPC . G06K 7/0008; G06K 19/0723; G08B 21/22; E05B 73/0017; G06Q 30/02; G06Q 10/087
USPC .......... 340/10.1–10.5, 572.1–572.9; 235/451, 235/375–385
See application file for complete search history.

(56) References Cited

U.S. PATENT DOCUMENTS 6,388,562 B1 * 5/2002 Takiguchi ............ G06K 7/0008
235/375
7,274,284 B2 * 9/2007 Dressen ............. G06K 7/10039
235/451

(Continued)

FOREIGN PATENT DOCUMENTS

EP 0924635 A2 6/1999
EP 1001366 A2 5/2000
(Continued)

OTHER PUBLICATIONS

Joint Technical Committee ISO/IEC JTC 1, "Notification of Ballot: ISO/IEC FCD 14443-3 (Revision)", Secretariat ISO/IEC JTC/SC 17, Nov. 24, 2008, 66 pages.

(Continued)

*Primary Examiner* — George Bugg
*Assistant Examiner* — Munear Akki
(74) *Attorney, Agent, or Firm* — Kilpatrick Townsend & Stockton LLP

(57) ABSTRACT

Techniques for CSC detection and selection include generating a radio frequency (RF) field that defines a range of communication for the CSC reader, transmitting a signal in the RF field, and detecting a modulation in the RF field indicating that a first CSC is within the RF field and has responded to the signal. The modulation is inspected for collision, wherein collision occurs if more than one CSC within the RF field responds to the poll signal. After determining that the modulation does not contain a collision, a halt command is transmitted to the first CSC instructing the CSC to only respond to one or more specific commands.

20 Claims, 6 Drawing Sheets

(51) Int. Cl.
  *G06F 17/00*   (2006.01)
  *G06K 7/08*    (2006.01)
  *G06K 13/00*   (2006.01)
  *G06K 7/10*    (2006.01)

(56) References Cited

U.S. PATENT DOCUMENTS

| | | | | |
|---|---|---|---|---|
| 7,880,587 | B2* | 2/2011 | Amtmann | H04L 12/413 340/10.1 |
| 8,994,501 | B2* | 3/2015 | O'Haire | G06K 7/10009 340/10.1 |
| 2004/0036575 | A1* | 2/2004 | Patterson | G06K 7/0008 340/10.3 |
| 2006/0022042 | A1* | 2/2006 | Smets | G01R 31/302 235/451 |
| 2006/0176152 | A1 | 8/2006 | Wagner et al. | |
| 2006/0273176 | A1* | 12/2006 | Audebert | G06K 19/07336 235/451 |
| 2006/0283960 | A1* | 12/2006 | Top | G06K 19/0716 235/492 |
| 2008/0042803 | A1 | 2/2008 | Posamentier | |
| 2008/0100439 | A1* | 5/2008 | Rinkes | G06K 7/0008 340/572.1 |
| 2009/0284354 | A1* | 11/2009 | Pinkham | 340/10.3 |

FOREIGN PATENT DOCUMENTS

| | | |
|---|---|---|
| EP | 1017005 A2 | 7/2000 |
| EP | 1 321 889 A2 | 6/2003 |
| JP | 2000298712 A | 10/2000 |
| WO | 9852142 A1 | 11/1998 |

OTHER PUBLICATIONS

ISR/WO mailed on Nov. 14, 2014 for International Patent Application PCT/US2014/051898 filed on Aug. 20, 2014, all pages.

* cited by examiner

CARD DETECTION AND SELECTION

CROSS-REFERENCE TO RELATED APPLICATION

The present application claims benefit under 35 USC 119(e) of U.S. Provisional Patent Application No. 61/982,638, filed Apr. 22, 2014, entitled "CARD DETECTION AND SELECTION," and U.S. Provisional Patent Application No. 61/867,931, filed Aug. 20, 2013, entitled "DETECTION OF MULTIPLE CARDS," the entire contents of which are incorporated by reference herein for all purposes.

BACKGROUND

1. The Field of the Invention

The present invention generally relates to contactless smart card readers and contactless smart cards. More specifically, the present invention relates to detection of multiple contactless smart cards and selection of a subset of the multiple contactless smart cards by contactless smart card readers.

2. The Relevant Technology

Contactless smart cards (CSCs) are used in conjunction with CSC readers to replace traditional cards with magnetic stripes that require swiping or other forms of contact in order to complete a transaction. When a CSC enters the radio frequency (RF) field of a CSC reader, the CSC reader can provide power to the CSC and establish communication. A CSC communicates with a CSC reader wirelessly using RF signals. Communication between the CSC and the CSC reader can be established through most materials, allowing a user to complete a transaction without having to remove the CSC from a wallet or pocket. CSCs can be utilized to identify the user, authenticate the user, or store data for the user.

BRIEF SUMMARY

In one embodiment, a method is executed by a contactless smart card (CSC) reader for CSC detection and selection. The method includes generating a radio frequency (RF) field that defines a range of communication for the CSC reader and transmitting a signal in the RF field. When a modulation in the RF field is detected indicating that at least one CSC is within the RF field and has responded to the signal, the modulation is inspected for collision. Collision occurs if more than one CSC is within the RF field and responds to the signal. If the CSC reader determines that the modulation does not contain a collision, a halt command is transmitted to the CSC. The halt command instructs the CSC to ignore all commands except for one or more specific commands.

In another embodiment, a CSC reader is provided for CSC detection and selection. The CSC reader includes an RF transceiver configured to transmit and receive signals within a generated RF field and a computer processor coupled to the RF transceiver. The computer processor is configured to utilize the RF transceiver to transmit a signal. A modulation in the RF field indicates that a CSC has entered the RF field and responded to the signal. The computer processor is further configured to detect the modulation and inspect the modulation for collision. If the computer processor determines that the modulation does not contain a collision, a halt command is transmitted to the CSC utilizing the RF transceiver.

In a further embodiment, the method or device alters the transmission power level of the RF field after transmitting the halt command to the detected CSC, and then resumes polling for additional CSCs within the RF field. If additional CSCs are not detected within the RF field before a preset period of time has passed, the method or device sends a wakeup command to the detected CSC and selects the detected CSC for conducting a transaction. If additional CSCs are detected, the method or device can choose a CSC based on a predefined criteria or alert the user by providing an indication of collision.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
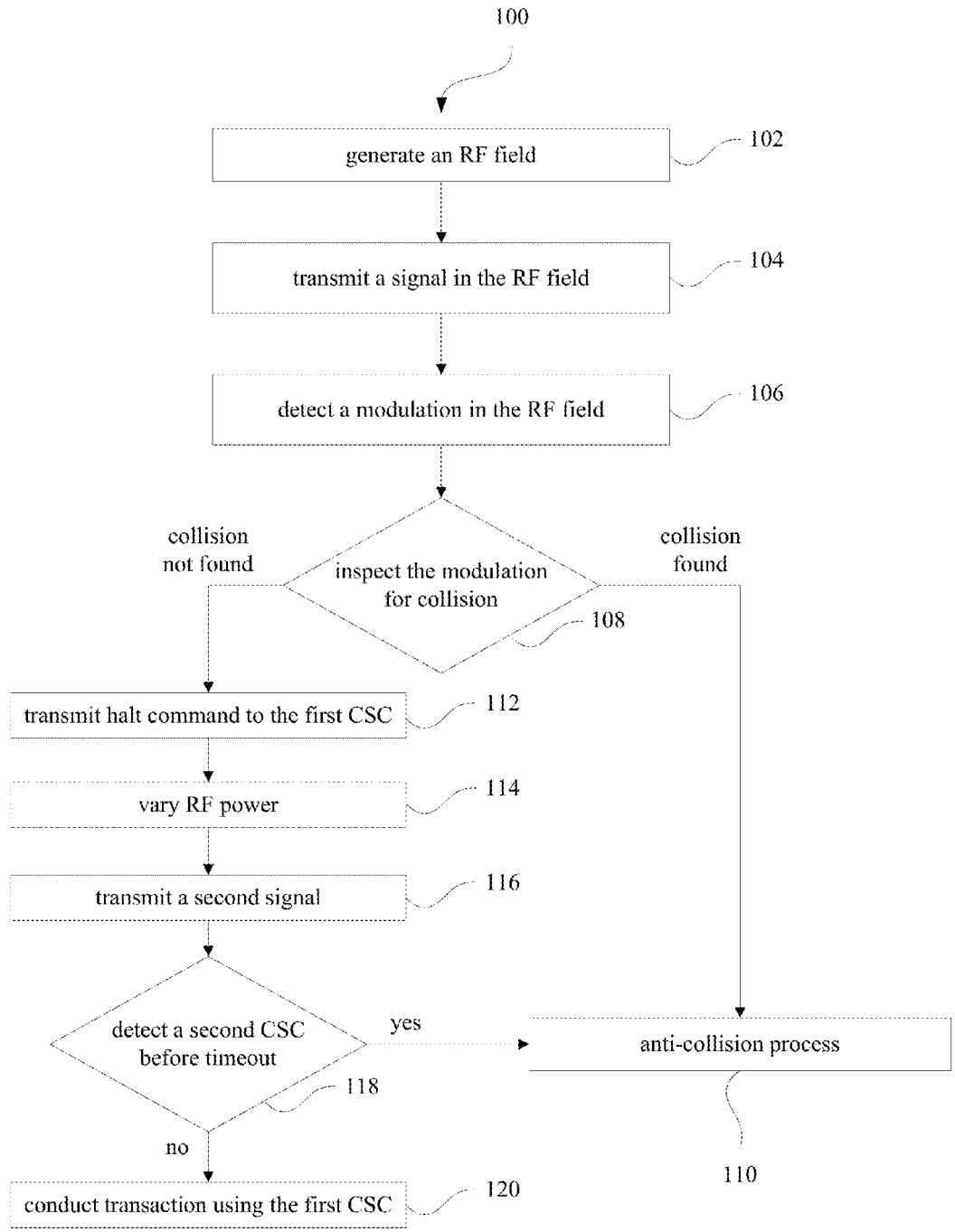
FIG. 1 is a flowchart of one embodiment of a process implemented by a contactless smart card reader for card detection and selection.

For the purposes of explanation, the ensuing numerous provides specific details are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

As the use of contactless smart cards (CSCs) becomes more widespread, there is an increasing probability that a user is carrying more than one CSC. Multiple CSCs of similar type will be detected under ideal conditions. A CSC standard such as ISO14443 specifies a so-called anti-collision process to handle such situations. When a CSC reader conforming to the standard detects multiple CSCs, the reader can select a single CSC and issue a halt command to the selected CSC. The halt command instructs the CSC to ignore all commands except for one or more specific commands, such as a wakeup command. Under the standard, this selection and halt process is only used if multiple CSCs are detected.

However, CSCs can vary in signal strength or the amount of power they need to operate. A weaker CSC might not have enough power to operate or its signal might be so low that it is drowned out by a stronger CSC. Depending on the timing, one or more CSCs might also end in a state where they don't respond to the polling request because they have received the commands to another CSC. It is fairly common that one CSC dominates and the CSC reader never detects multiple CSCs in the RF field.

One example of where this situation can present a problem is in mass transit systems that utilize CSCs to collect fares. Some mass transit systems only accept closed loop CSCs that belong to the particular system. Other mass transit systems also accept CSCs issued by banks Thus, if a user presents a wallet containing both a transit CSC and a bank CSC, there is a possibility that the CSC reader will only detect the bank CSC. As a result, the fare will be collected from the user's bank account instead of the transit account, which can provide discounted fares or other incentives for the user.

Additionally, some CSCs require more power when advanced encryption is used, typically during the authentication process. As a result, a CSC can have enough power during the detection, anti-collision and selection process, but not enough power to run the cryptography engine on the card, causing the transaction to fail entirely.

Embodiments of the present invention overcome the disadvantages of the prior art by performing the selection and halt process even if only one CSC was detected. This allows all CSCs in the RF field, including a weaker CSC, to be detected. Furthermore, by varying the radio frequency (RF) power, a CSC reader can make a selection between weaker or stronger CSCs and/or between CSCs that are closer or further away from the CSC reader. The CSC reader can start by polling for cards at a lower or higher power level and place any card that is found into the HALT state for later processing. This ensures that all CSCs have enough power available, and allows the CSC reader to choose which CSC to interact with or alert the user when multiple CSCs are detected.

FIG. 1 is a flowchart of one embodiment of a process 100 implemented by a CSC reader for CSC detection and selection. The CSC reader generates an RF field that is used for communication with CSCs that enter the RF field at Block 102. The RF field forms a volume around the CSC reader, and the CSC reader can transmit and receive RF signals through the RF field. Thus, the RF field defines a range of communication for the CSC reader. The CSC reader then transmits a signal (Block 104) to detect CSCs in the RF field. The signal can be a polling signal or any other signal for communicating with CSCs. In the case of a polling signal, a CSC reader will typically transmit the signal repeatedly until a CSC is detected. At Block 106, the CSC reader detects a modulation in the RF field, indicating that at least one CSC has entered the RF field and responded to the signal. After detecting the modulation, the CSC reader inspects the modulation for collision (Block 108). Collision is detected if more than one CSC is in the RF field and responded to the signal. If collision is found in the modulation, the anti-collision process is performed (Block 110). If collision is not found, process 100 continues to Block 112, where the CSC reader transmits a halt command to the first CSC that was detected. The halt command instructs the CSC to ignore all commands except one or more specific commands, such as a wakeup command.

In some embodiments, the CSC reader varies the power of the RF field (Block 114) before transmitting a second signal at Block 116 to detect additional CSCs. The RF power level can be increased or attenuated at Block 114. By increasing the power level, CSCs that did not receive enough power at the lower power level can now enter into the IDLE state and respond in a predictable way. Additionally, CSCs that were detected and selected at a lower power level is very likely to have sufficient power for all operations if the power level is increased.

In one embodiment, the CSC reader will transmit the second signal (Block 116) for a preset period of time. If a second CSC is detected before the period of time has ran out at Block 118, process 100 will go to Block 110 to perform the anti-collision process. In one embodiment, during the anti-collision process at Block 110, the CSC reader will select a single CSC out of the multiple CSCs that are detected using a predefined criteria. For example, in the case of a mass transit system, the CSC reader can be programmed to select a CSC issued by the transit system over CSCs issued by other systems such as banks for conducting a transaction. In other embodiments, the CSC reader will simply provide a notification to the user indicating that more than one CSC has been presented. The notification can be a visual, audio, or some other form of sensory notification. Additionally, the notification can instruct the user to present only one CSC. If a second CSC is not detected before the timeout at Block 118, the CSC reader will select the first CSC for conducting a transaction (Block 120).

Figure 2:
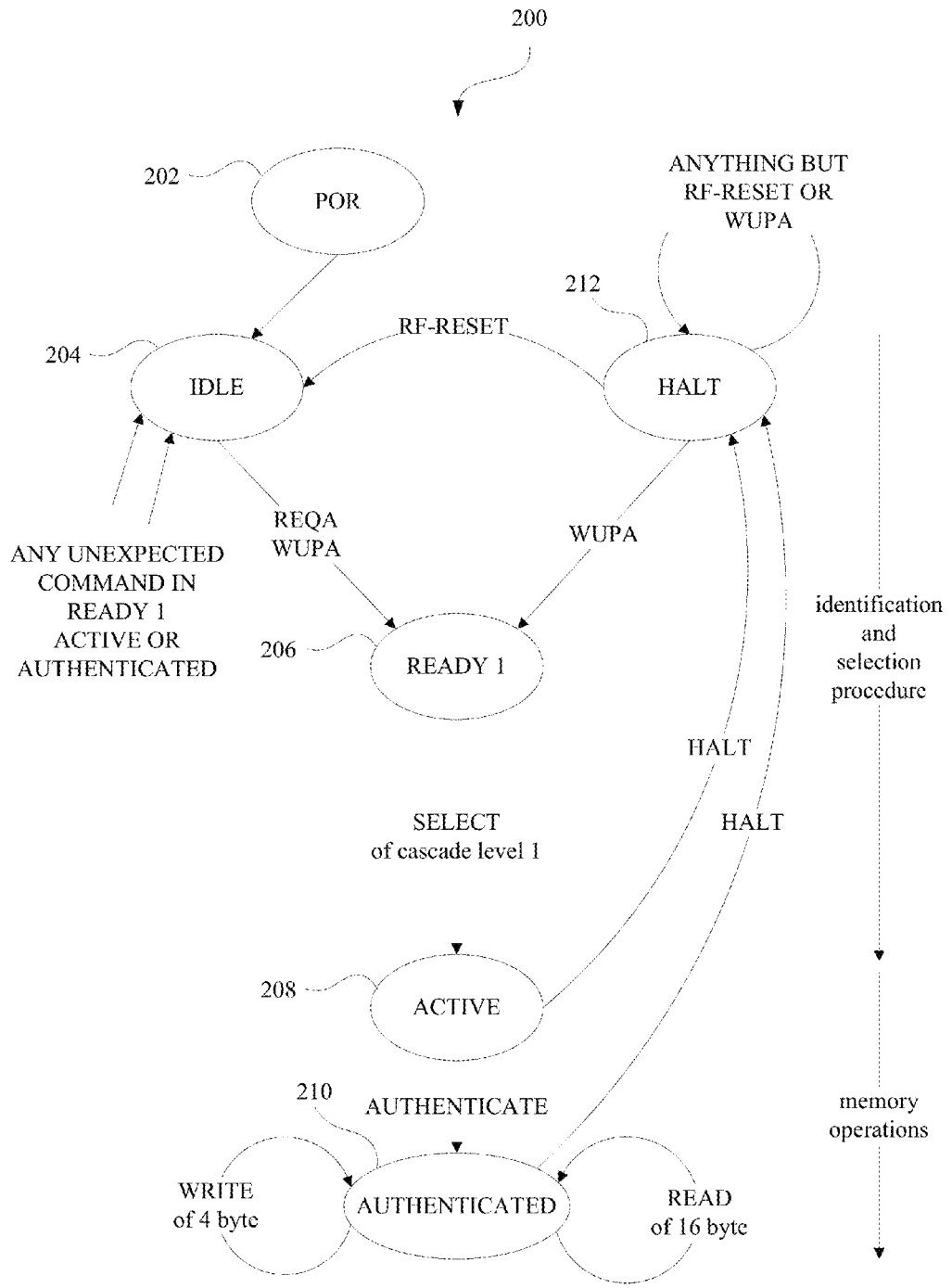
FIG. 2 is a state diagram of a contactless smart card that is in communication with a contactless smart card reader implementing one embodiment of a process for card detection and selection.

FIG. 2 is a state diagram 200 of a CSC that is in communication with a CSC reader implementing one embodiment of a process for CSC detection and selection. In this embodiment, the CSC is a type-A CSC. When the CSC enters the RF field of a compatible CSC reader and receives enough power, the CSC will start in the POR (power on reset) state 202 and then go to the IDLE state 204. A CSC will also go to the IDLE state 204 if it receives any unexpected commands while it is in the READY 1 state 206, ACTIVE state 208, or AUTHENTICATED state 210. If the CSC receives either a REQA (request type A) or a WUPA (wakeup type A) command, the CSC will go to the READY 1 state 206. The REQA command allows the CSC reader to go through a number of CSCs, since the CSCs will not respond to the REQA command after they are in the HALT state 212. If the REQA command is continually issued, a CSC will respond every other time (i.e., toggle between IDLE state 204 and "error state").

If the CSC receives a SELECT command while it is in the READY 1 state 206, the CSC will go to the ACTIVE state 208. Then, an AUTHENTICATE command can be issued to place the CSC in the AUTHENTICATED state 210. Once in the AUTHENTICATED state 210, READ and WRITE operations can be performed on the CSC so that a transaction can be conducted. If a HALT command is received by the CSC while it is in either the ACTIVE state 208 or the AUTHENTICATED state 210, the CSC will go to the HALT state 212. In this state, an RF-RESET command will place the CSC into the IDLE state 204 and a WUPA command will place the CSC into the READY 1 state 206. All other commands will be ignored and the CSC will remain in the HALT state 212.

Figure 3:
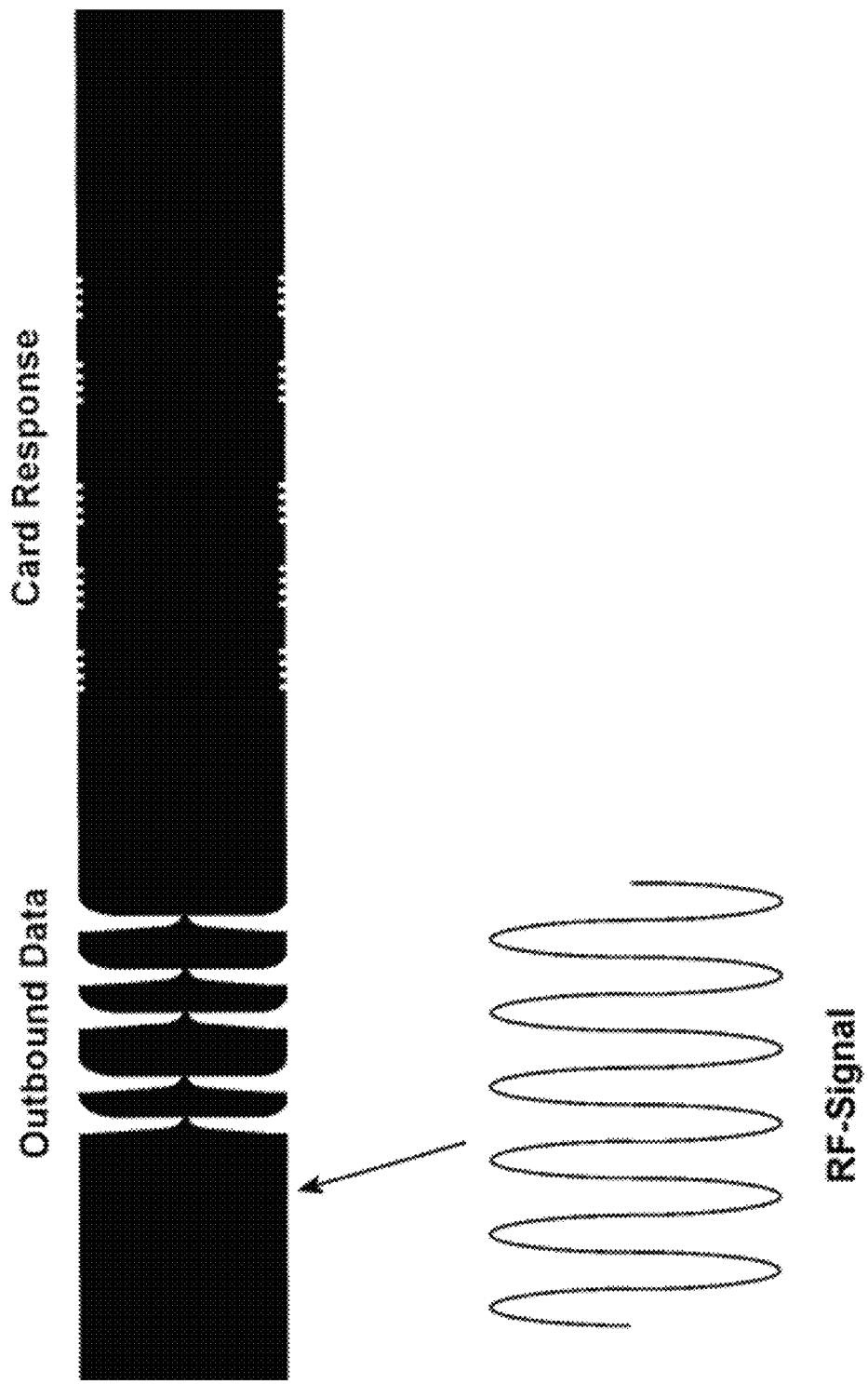
FIG. 3 is an illustration of a typical radio frequency field amplitude over time during communication between a contactless smart card reader and a contactless smart card.

FIG. 3 is an illustration of a typical RF field amplitude over time during communication between a CSC reader and a CSC. The CSC reader transmits a signal in the outbound data and the CSC responds by load-modulating the RF field amplitude using Manchester coding of a sub-carrier. The transmitted signal can be a polling signal, or a signal to issue a command such as an ANTICOLLISION or SELECT command, and the CSC response can vary depending on the type of transmitted signal. In this example, there is only one CSC, so the response does not contain a collision.

Figure 4:
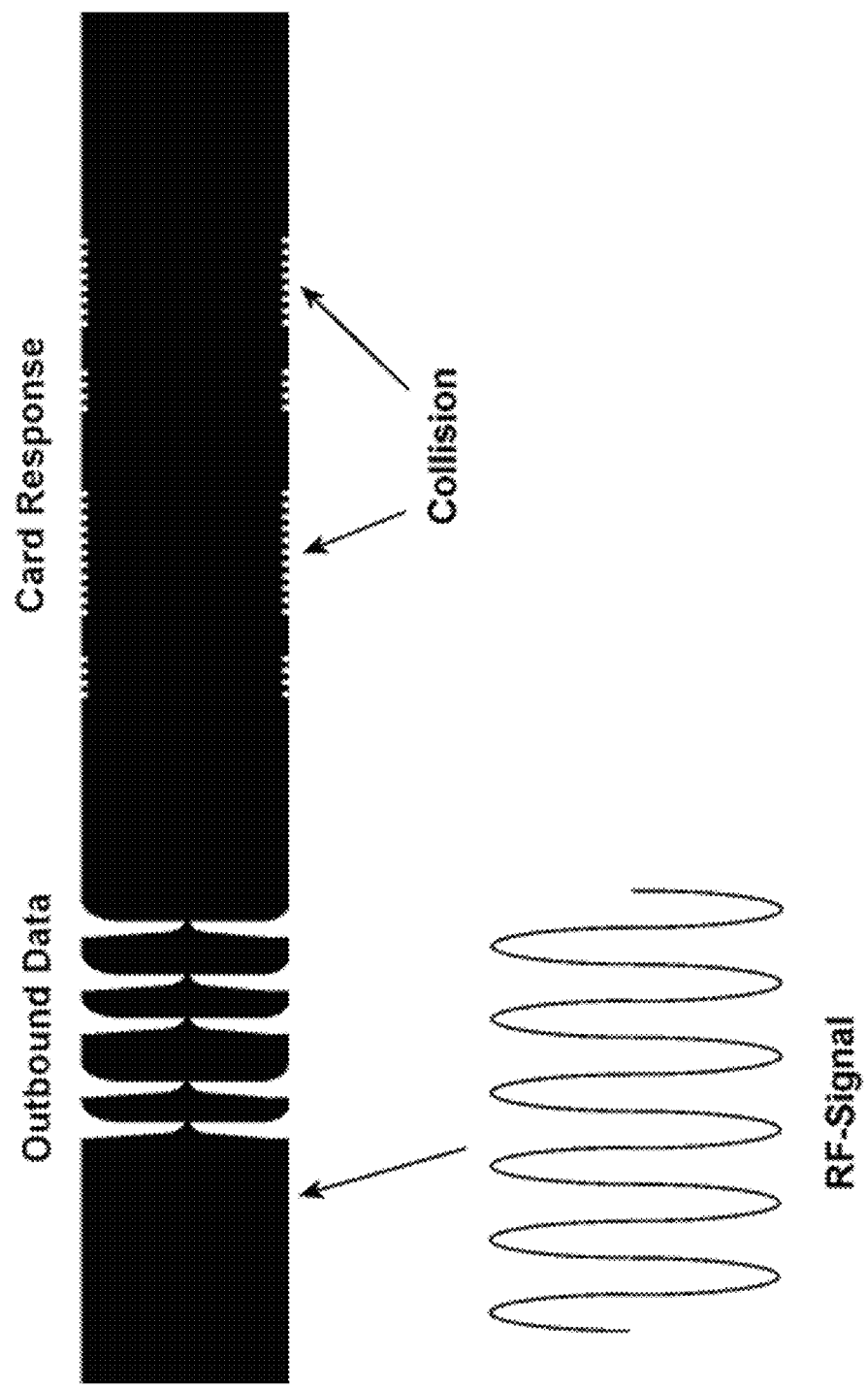
FIG. 4 is an illustration of a typical radio frequency field amplitude over time during communication between a contactless smart card reader and multiple contactless smart cards.

FIG. 4 is an illustration of a typical RF field amplitude over time during communication between a contactless smart card reader and multiple CSCs. In this example, two CSCs receive enough power. The CSCs respond to a signal transmitted by the CSC reader by load modulating the RF field amplitude. The difference in response causes a collision in the Manchester coded data. The CSC reader can detect the collision if the load modulation from the CSCs is of similar strength.

Figure 5:
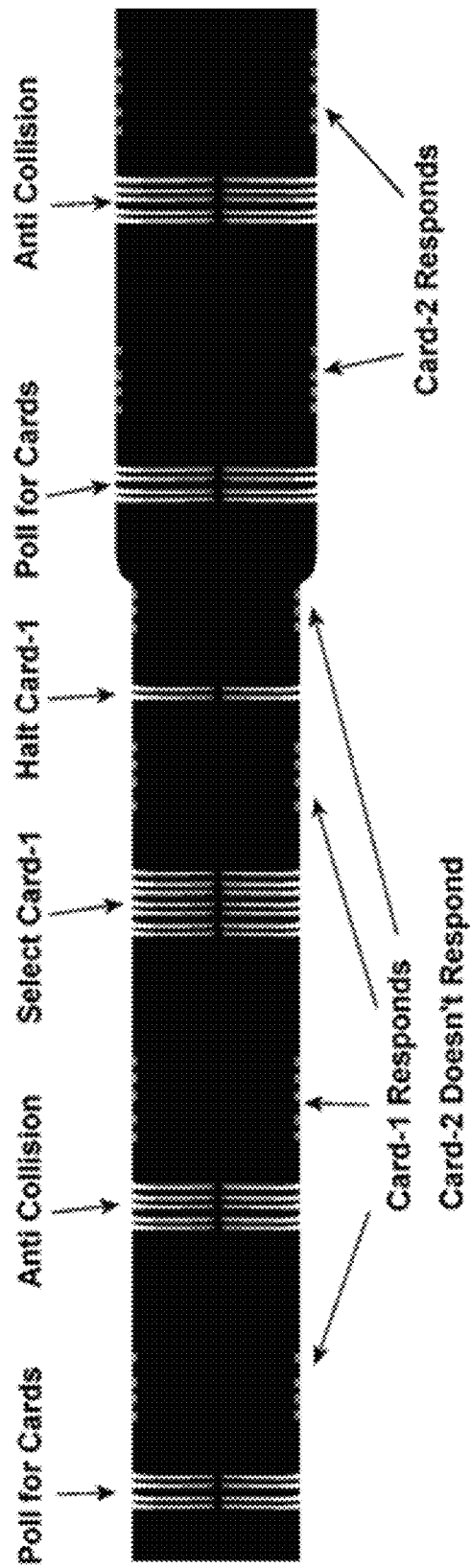
FIG. 5 is an illustration of a radio frequency field amplitude over time during communication between one embodiment of a contactless smart card reader and multiple contactless smart cards.

FIG. 5 is an illustration of an RF field amplitude over time during communication between one embodiment of a CSC reader and multiple CSCs. In this example embodiment, one of two cards has sufficient power to operate at the lower power level and is selected and put into the HALT state. The CSC reader increases the power level and the second card now responds to the poll. The corresponding polling pattern would be: 1) poll for cards at 80% RF strength, 2) find card(s) and send to halt state, 3) increase RF strength to 100% and poll again, 4) find card(s) and send to halt state, and 5) choose correct card from list. In other embodiments, the CSC reader can start at any RF power level between 0 and 100%, and the power level can be increased or decreased any number of times in any increments. For example, the CSC reader can start at 50% RF power and increase the RF power in 10% increments, polling for cards after each increase until 100% power is reached.

Figure 6:
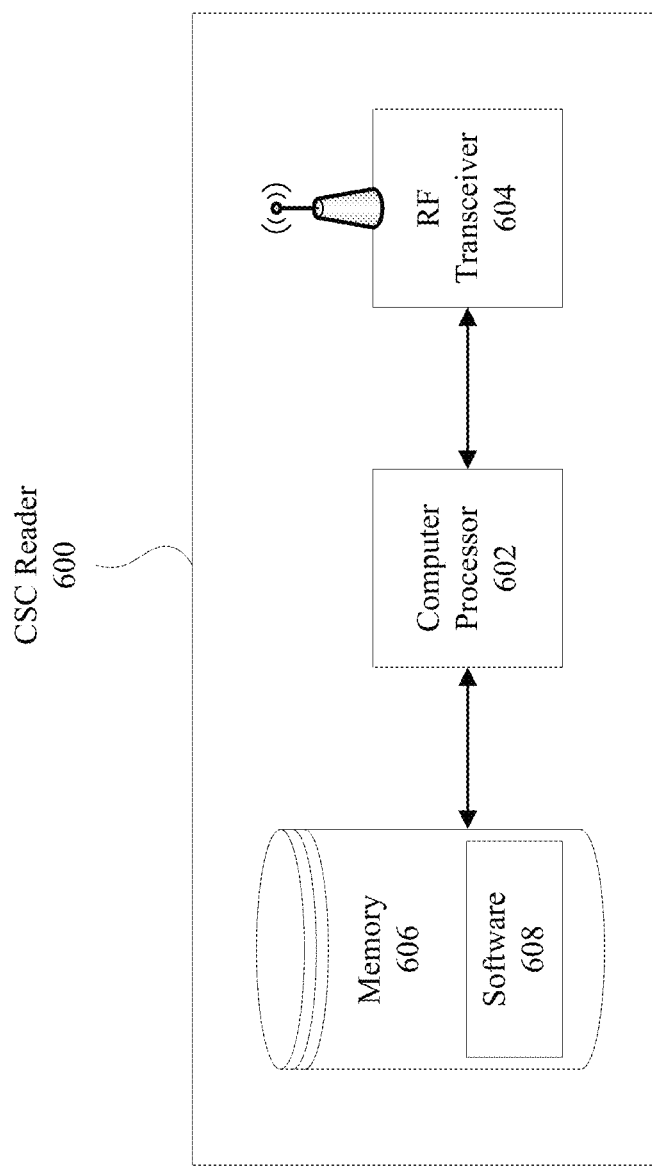
FIG. 6 is a block diagram of an embodiment of a contactless smart card reader.

FIG. 6 is a block diagram of one embodiment of a CSC reader 600. CSC reader 600 includes a computer processor 602, an RF transceiver 604, and a memory module 606. Memory module 606 can be any non-transitory machine-readable media, such as optical disks or flash memory devices. Software 608 is stored in memory module 606 and provides instructions to computer processor 602 according to any of the embodiments described herein. Computer processor 602 utilizes RF transceiver 604 to generate an RF field and communicates with CSCs within the RF field by transmitting and receiving RF signals through the RF field. It will be understood that the CSC reader 600 can include additional components not shown in FIG. 6, such as a communication interface for communicating with a network (which may be separate or combined with the RF transceiver 604). Additionally or alternatively, alternative embodiments may combine, separate, omit, and/or rearrange the components shown in FIG. 6.

Application of the embodiments described herein is not limited to transit, but can also be used anywhere CSCs are used, such as retail, banking, etc. Moreover, although "type-A" CSCs, as defined by the ISO14443 standard, are used as examples in this description, the embodiments described herein also apply to other types of CSCs, including but not limited to type-B, proposed type-C, and proposed type-D, as well as a combination of different types of CSCs. Furthermore, in some embodiments, CSCs do not follow the standard exactly, which is another reason why sorting through multiple CSCs using varying power levels would be more reliable.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

While illustrative and presently preferred embodiments of the disclosed systems, methods, and devices have been described in detail herein, it is to be understood that the inventive concepts may be otherwise variously embodied and employed, and that the appended claims are intended to be construed to include such variations, except as limited by the prior art.

What is claimed is:

1. A method executed by a contactless smart card (CSC) reader for CSC detection and selection, the method comprising:
   generating a radio frequency (RF) field that defines a range of communication for the CSC reader;
   transmitting a first poll signal for a particular type of CSC in the RF field, the particular type of CSC comprising one of type-A CSC, type-B CSC, proposed type-C CSC, or proposed type-D CSC as defined by ISO 14443;
   detecting a modulation in the RF field indicating that a first CSC is within the RF field and has responded to the first poll signal;
   inspecting the modulation for a collision, wherein the collision occurs if more than one CSC within the RF field responds to the first poll signal;
   determining that the modulation does not contain the collision;
   transmitting a halt command to the first CSC in response to determining that the modulation does not contain the collision, wherein the halt command instructs the first CSC to only respond to a wakeup command; and
   transmitting a second poll signal for the particular type of CSC in the RF field after transmitting the halt command to the first CSC and before conducting a transaction, wherein the first CSC does not respond to the second poll signal.

2. The method of claim 1, further comprising:
   increasing a power level of the RF field after transmitting the halt command and before transmitting the second poll signal.

3. The method of claim 1, further comprising the steps of:
   attenuating a power level of the RF field after transmitting the halt command and before transmitting the second poll signal.

4. The method of claim 1,
   wherein the second poll signal is transmitted in the RF field after a preset period of time has passed since transmitting the halt command to the first CSC.

5. The method of claim 1, further comprising:
   transmitting the second poll signal in the RF field for a preset period of time;
   transmitting the wakeup command to the first CSC after the preset period of time has passed; and
   selecting the first CSC for conducting a transaction.

6. The method of claim 1, further comprising:
   detecting that a second CSC is within the RF field; and
   generating at least one of a visual notification and an audio notification for a user, the notification informing the user that more than one CSC has been presented.

7. The method of claim 1, further comprising:
   detecting that a second CSC is within the RF field; and
   selecting one of the first CSC and the second CSC for conducting a transaction based on a predefined criteria.

8. A contactless smart card (CSC) reader for CSC detection and selection, the CSC reader comprising:

a radio frequency (RF) transceiver configured to generate an RF field, and transmit and receive signals within the RF field; and a computer processor coupled to the RF transceiver and configured to utilize the RF transceiver to transmit a first poll signal for a particular type of CSC in the RF field, detect a modulation in the RF field indicating that a first CSC is within the RF field and has responded to the first poll signal, inspect the modulation for a collision, determine that the modulation does not contain the collision, utilize the RF transceiver to transmit a halt command to the first CSC in response to determining that the modulation does not contain the collision, and utilize the RF transceiver to transmit a second poll signal for the particular type of CSC in the RF field after transmitting the halt command to the first CSC and before conducting a transaction, wherein the first CSC does not respond to the second poll signal, wherein the collision occurs if more than one CSC within the RF field responds to the first poll signal, the particular type of CSC comprises one of type-A CSC, type-B CSC, proposed type-C CSC, or proposed type-D CSC as defined by ISO 14443, and the halt command instructs the first CSC to only respond to a wakeup command.

9. The CSC reader of claim 8, wherein the computer processor is further configured to increase a power level of the RF transceiver after transmitting the halt command and before transmitting the second poll signal.

10. The CSC reader of claim 8, wherein the computer processor is further configured to attenuate a power level of the RF transceiver after transmitting the halt command and before transmitting the second poll signal.

11. The CSC reader of claim 8, wherein the computer processor is further configured to utilize the RF transceiver to transmit the second poll signal in the RF field after a preset period of time has passed since transmitting the halt command to the first CSC.

12. The CSC reader of claim 8, wherein the computer processor is further configured to utilize the RF transceiver to transmit the second poll signal in the RF field for a preset period of time, utilize the RF transceiver to transmit the wakeup command to the first CSC after the preset period of time has passed, and select the first CSC for conducting a transaction.

13. The CSC reader of claim 8, wherein the computer processor is further configured to detect that a second CSC is within the RF field, and generate at least one of a visual notification and an audio notification for a user, the notification informing the user that more than one CSC has been presented.

14. The CSC reader of claim 8, wherein the computer processor is further configured to detect that a second CSC is within the RF field, and select one of the first CSC and the second CSC for conducting a transaction based on a predefined criteria.

15. A non-transitory computer-readable medium, having instructions stored therein, which when executed cause a computer to perform a set of operations comprising:

generating a radio frequency (RF) signal to form an RF field that defines a range of communication;

transmitting a first poll signal for a particular type of CSC in the RF field, the particular type of CSC comprises one of type-A CSC, type-B CSC, proposed type-C CSC, or proposed type-D CSC as defined by ISO 14443;

detecting a modulation in the RF field indicating that a first contactless smart card (CSC) is within the RF field and has responded to the first poll signal;

inspecting the modulation for a collision, wherein the collision occurs if more than one CSC within the RF field responds to the first poll signal;

determining that the modulation does not contain the collision;

transmitting a halt command to the first CSC in response to determining that the modulation does not contain the collision, wherein the halt command instructs the first CSC to only respond to a wakeup command; and transmitting a second poll signal for the particular type of CSC in the RF field after transmitting the halt command to the first CSC and before conducting a transaction, wherein the first CSC does not respond to the second poll signal.

16. The non-transitory computer-readable medium of claim 15, having further instructions stored therein, which when executed cause the computer to perform a set of operations comprising:

increasing a power level of the RF field after transmitting the halt command and before transmitting the second poll signal.

17. The non-transitory computer-readable medium of claim 15, having further instructions stored therein, which when executed cause the computer to perform a set of operations comprising:

reducing a power level of the RF field after transmitting the halt command and before transmitting the second poll signal.

18. The non-transitory computer-readable medium of claim 15, having further instructions stored therein, which when executed cause the computer to perform a set of operations comprising:

transmitting the second poll signal in the RF field for a preset period of time;

transmitting the wakeup command to the first CSC after the preset period of time has passed; and selecting the first CSC for conducting a transaction.

19. The non-transitory computer-readable medium of claim 15, having further instructions stored therein, which when executed cause the computer to perform a set of operations comprising:

detecting that a second CSC is within the RF field; and generating at least one of a visual notification and an audio notification for a user, the notification informing the user that more than one CSC has been presented.

20. The non-transitory computer-readable medium of claim 15, having further instructions stored therein, which when executed cause the computer to perform a set of operations comprising:

detecting that a second CSC is within the RF field; and selecting one of the first CSC and the second CSC for conducting a transaction based on a predefined criteria.

* * * * *